(12) United States Patent
Baccar

(10) Patent No.: US 6,529,628 B1
(45) Date of Patent: Mar. 4, 2003

(54) ROW AND COLUMN FEATURE DETECTION IN BINARY IMAGES

(75) Inventor: Mohamed Baccar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/479,581

(22) Filed: Jan. 7, 2000

(51) Int. Cl.$^7$ ................................................. G06K 9/34
(52) U.S. Cl. ........................ 382/173; 382/190; 382/149
(58) Field of Search ................................ 382/173, 203, 382/180, 190, 195, 145, 149, 205

(56) References Cited

U.S. PATENT DOCUMENTS 5,153,444 A * 10/1992 Maeda et al. .......... 250/559.05
5,793,932 A * 8/1998 Kuratomi et al. ........... 382/190
5,999,647 A * 12/1999 Nakao et al. ............... 382/177
6,014,450 A * 1/2000 Heilper et al. .............. 382/176

OTHER PUBLICATIONS

Berthold Klaus Paul Horn, "Binary Images: Topological Properties", Robot Vision, The MIT Press, 1986, pp. 65–85.

* cited by examiner

Primary Examiner—Phuoc Tran
(74) Attorney, Agent, or Firm—Marger Johnson & McCollom, P.C.

(57) ABSTRACT

Raster reduction is performed on a binary image. The binary image includes a number of features, and the raster reduction decomposes the binary image into rectangular areas of features. The binary image is separately decomposed into row-oriented rectangles and column-oriented rectangles. Row- and column-oriented decomposition involves identifying rectangles that are as long as possible along the orientation direction including only contiguous features, and then widening the rectangles to include segments of contiguous features in neighboring contiguous rows or columns, without including segments that belong in other rectangles. The row- and column-oriented rectangles are then merged into a set. The rectangle set is then ordered, and a subset of the rectangles is selected. The selected rectangles cover every feature in the binary image. The binary image is then displayed using the set of selected rectangles, each selected rectangle being displayed in a different color. For comparison purposes, the row- and column-oriented decompositions can also be displayed, with each rectangle in the decomposition being displayed in a different color.

30 Claims, 10 Drawing Sheets

ROW AND COLUMN FEATURE DETECTION IN BINARY IMAGES

FIELD OF THE INVENTION

This invention pertains to computer image processing and more particularly to identification and labeling of features in a binary image.

BACKGROUND OF THE INVENTION

Computer image processing is a large and growing field. The ability to process images to isolate features of practical interest is an important recognition tool. Feature extraction from images has a wide application in Computer Vision, Robotics, and other areas. Images are typically drawn using sensory devices such as Charge-Coupled Devices (CCDs), or range, proximity, and touch sensors. Feature extraction on these images is often divided into three components, namely: preprocessing, feature extraction, and feature detection. Problems associated with this type of analysis include object recognition in a three dimensional scene, character recognition, and geometrical characteristics in a given binary shape obtained using touch sensors such as center, and orientation angles.

Feature extraction is also applicable to other areas, such as silicon manufacturing. Memory devices in microprocessor products form a rectangular grid of memory cells, in which any given cell can fail. After testing such a device, information is extracted about the pass/fail status of each cell, yielding a binary image where a "one" represents a failed status, and a "zero" represents a pass status. The type of defects affecting memory cells exhibit themselves in full or partial rows or columns and in bit signatures such as single, double, or multiple bits. When looking at an input image, these types of defects have a very distinct shape. Morphology or image labeling techniques can be extended to isolate these features in the image.

In the past, heuristics were used to identify defects in the memory module from features of the binary image. For example, larger defects were assumed to be a collection of many adjacent smaller defects. Heuristics are difficult to implement and expensive to execute. Where a binary image has many small objects, such as a transformed memory map, using heuristics is impractical.

SUMMARY OF THE INVENTION

The invention is a method and system for raster reduction of a binary image. The binary image includes a number of features. A software program decomposes the binary image separately into row- and column-oriented rectangles. A subset of the row-oriented rectangles and column-oriented rectangles are then selected that cover the features of the binary image.

DETAILED DESCRIPTION OF THE PREFERRED EMBODIMENT

Figure 1:
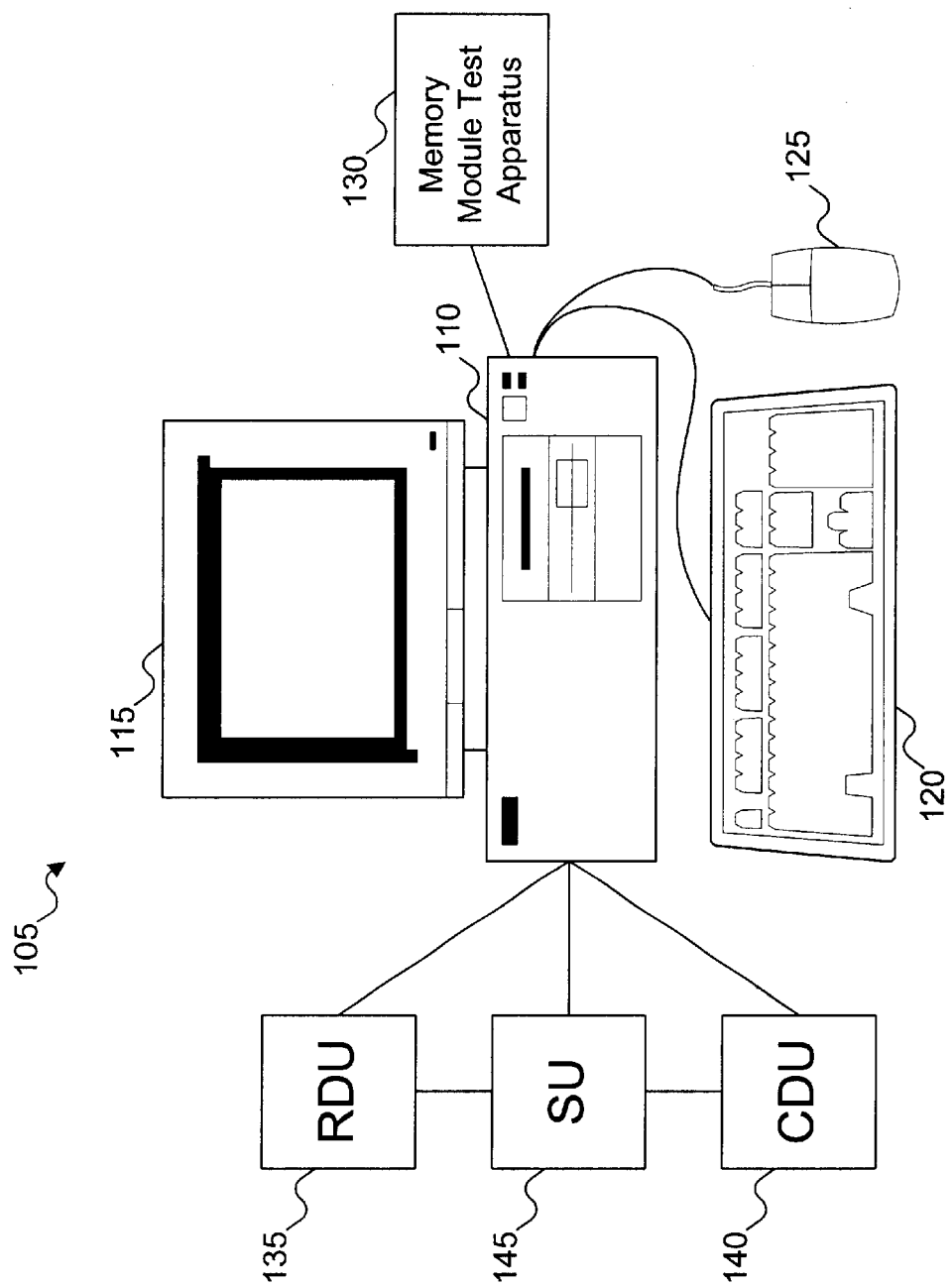
FIG. 1 shows a computer system for implementing the preferred embodiment of the invention.

FIG. 1 shows a computer system 105 in accordance with one embodiment of the invention. Computer system 105 includes a computer 110, a monitor 115, a keyboard 120, and a mouse 125. Computer 110 includes a central processing unit and memory (not shown). Computer system 105 can also include other equipment, not shown in FIG. 1, for example, other input/output equipment.

Attached to computer system 105 is a memory module test apparatus 130. Although not needed for general binary image processing, memory module test apparatus 130 can be used to map a memory module for defects and generate a binary image from the memory map that can be processed according to the invention. A person skilled in the art will recognize that other devices can be used to generate binary images for processing. A person skilled in the art will also recognize that devices like the memory module test apparatus 130 can be part of the computer system 105 rather than being externally coupled to computer system 105. Further, a person skilled in the art will recognize that binary images can be generated by devices outside FIG. 1 and brought to computer system 105 for processing, for example, by diskette, network connection, or other means.

Computer system 105 also includes a row decomposition unit 135, a column decomposition unit 140, and a selection unit 145. Generally, the row decomposition unit 135, column decomposition unit 140, and selection unit 145 will be implemented in software as a program executable on computer system 105. A person skilled in the art, however, will recognize that other implementations are possible, for example, as hardware circuits.

Figure 2:
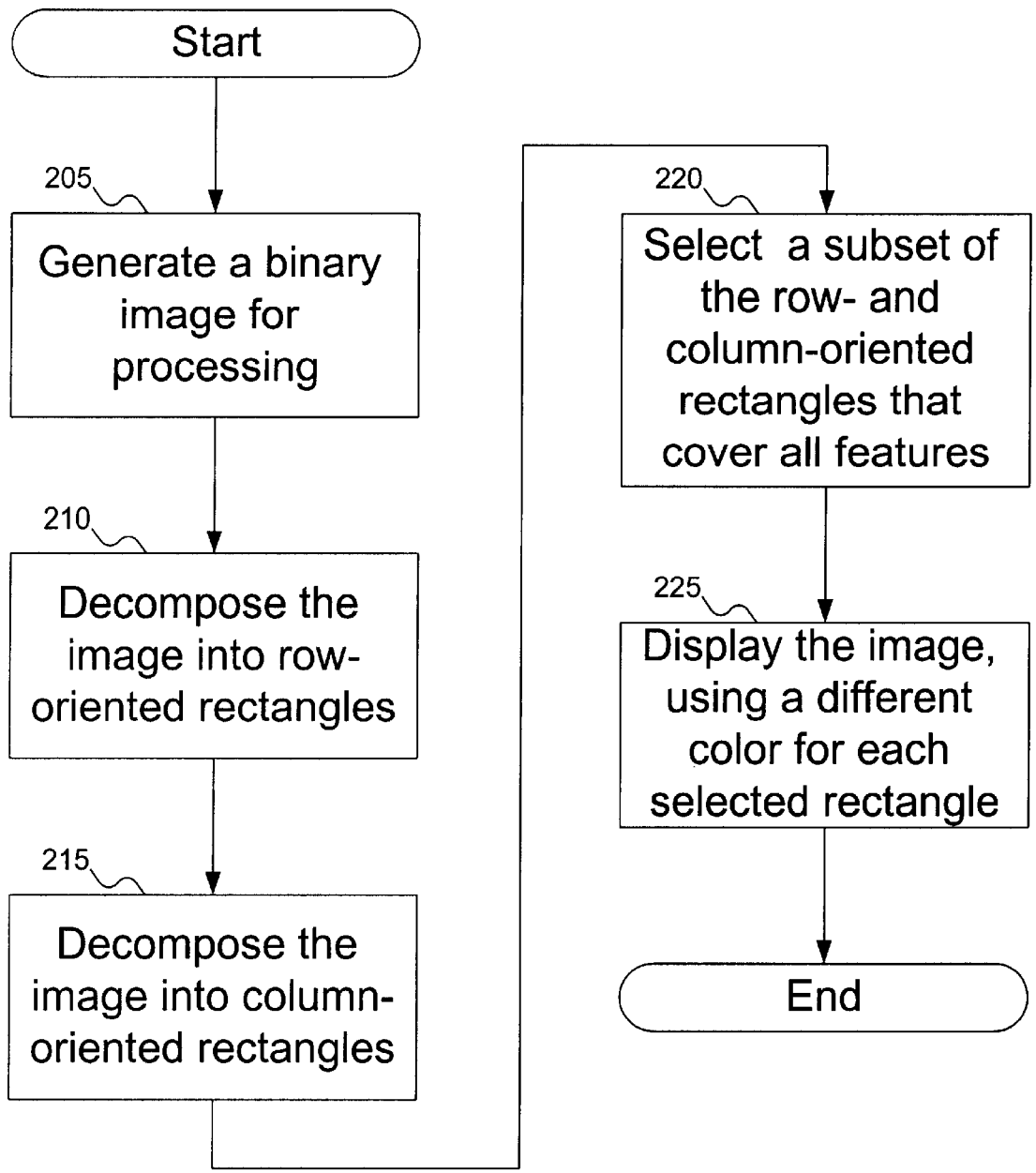
FIG. 2 shows a flowchart of a computer program that decomposes a binary image into a set of rectangles covering the image according to the preferred embodiment.

FIG. 2 shows a flowchart of a computer program that performs binary image processing according to the invention. At step 205, a binary image is generated for processing. For example, the binary image can be generated from a memory module map by the memory module test apparatus 130 of FIG. 1. If the binary image already exists, then this step can be skipped. Next, at steps 210 and 215, the image is decomposed into row- and column-oriented rectangles. The order in which the decomposition is done is not important, and a person skilled in the art will also recognize that the decomposition could be generalized for images that are not two-dimensional or that use a non-square tessellation. In the preferred embodiment, the rectangles are labeled in order to distinguish one rectangle from another within the same image, and the labels can help in the display step (see below). A person skilled in the art, however, will recognize that labeling is not a necessary tool, only a help. At step 220, a subset of the rectangles is selected that cover all the features of the image. The term "features" refers to those bits in the binary image that are set. "Covering" means that each feature in the binary image is included in at least one selected rectangle. Finally, at step 225, the decomposed binary image is displayed, with each rectangle shown using a different color or level of grayscale. If the rectangles are labeled, each label can be assigned a different color or grayscale level, and then the rectangle labels can be used to color the rectangles for display.

Optionally, step 225 can also include displaying the separate row- and column-oriented decompositions, again with each separate rectangle shown using a different color or level of grayscale. This may be helpful to the user to determine how the final decomposition was achieved.

Figure 3:
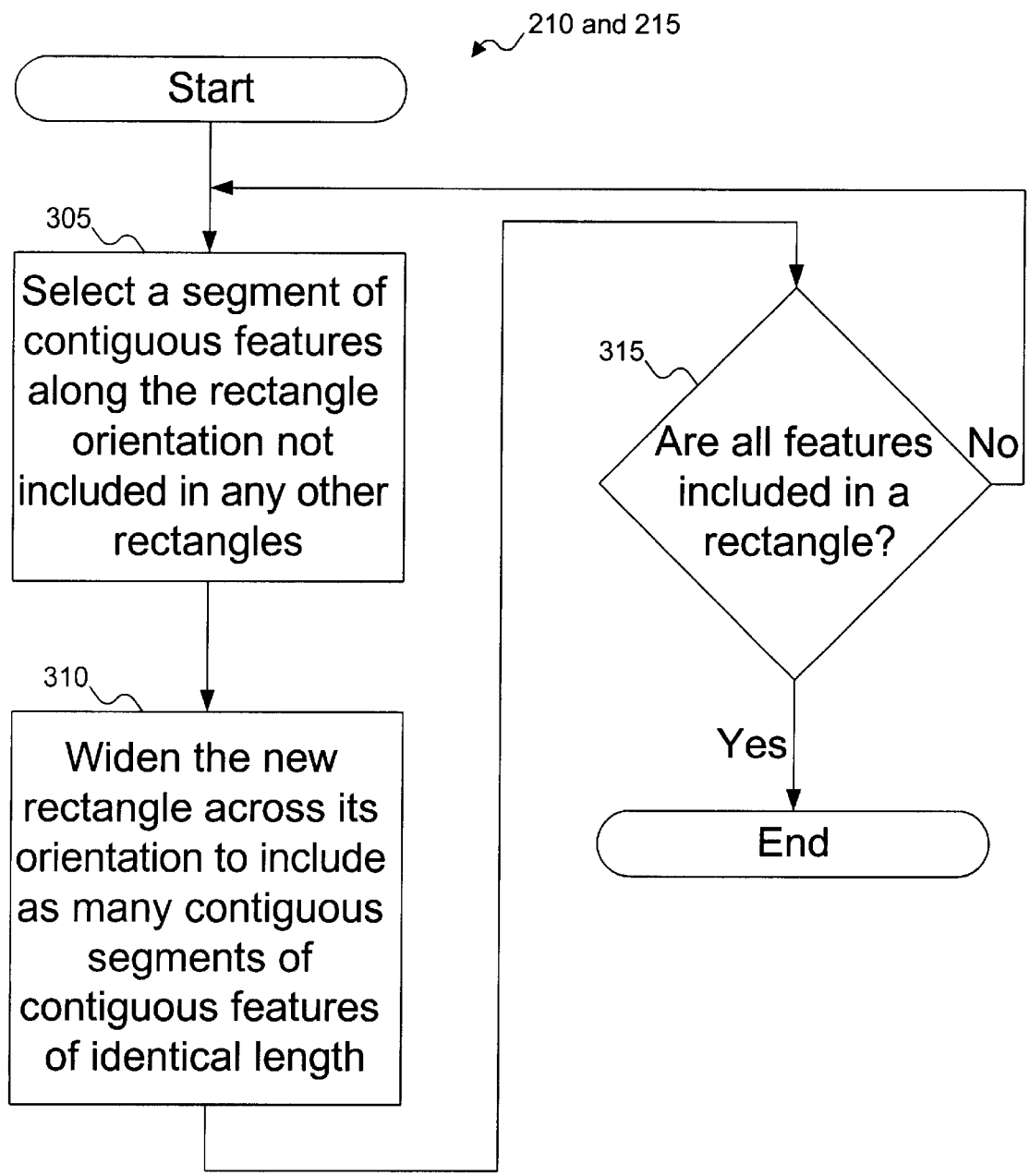
FIG. 3 shows a flowchart of a computer program that decomposes a binary image into rectangles oriented along one direction according to the preferred embodiment.

FIG. 3 shows a flowchart of how a decomposition of an image is done. Since the row and column decompositions are in principle the same except for direction, FIG. 3 describes a generic procedure applicable to either of the row-and column-oriented decompositions of steps 210 and 215. (Implementation of the invention may require different row- and column-oriented decompositions, depending on how the binary image is stored. For example, if the binary image is stored using a one-dimensional array, referencing the cell to the left of the current cell is simpler than referencing the cell to the top of the current cell.) First, at step 305, a contiguous segment of features along the direction of orientation that are not covered by another rectangle in the decomposition is selected. This segment is as large as possible: the adjacent bits in the image both before and after the segment are not features (i.e., the bits are not set). Then, at step 310, the rectangle is widened to include as many contiguous segments of identical length that are themselves of maximum length. Finally, at step 315, a check is performed to see if any features are not yet included in a rectangle. If there are any features not yet included in a rectangle, the process repeats. Otherwise, processing is finished.

Figure 3A:
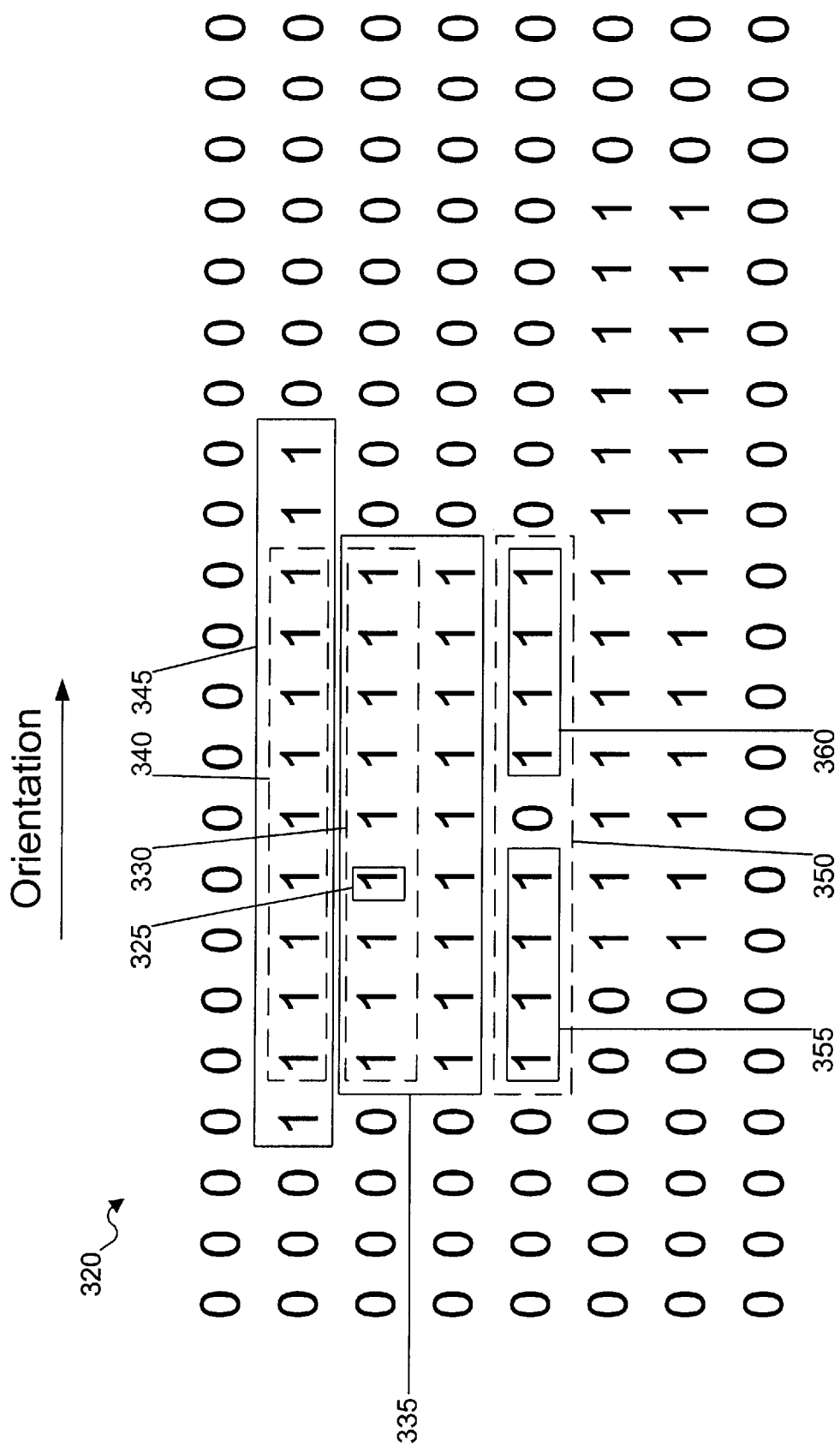
FIG. 3A shows an example of a binary image decomposition according to the flowchart of FIG. 3.

FIG. 3A shows graphically how the decomposition of a binary image can occur. FIG. 3A includes a binary image 320, where "ones" represent features. For example, binary image 320 might represent a map of a memory module, where "ones" represent defects in the memory module. At step 305, feature 325 is selected. Although in practice a deterministic method will be implemented to decompose binary image 320, a person skilled in the art will recognize that the invention can be implemented non-deterministically. The rectangle enclosing the feature is lengthened into a segment 330, which is then widened into a rectangle 335. Note that segment 340 is not included in rectangle 335, as a longer rectangle 345 includes segment 340. (Observe that the bits before and after segment 340 are features.) Similarly "segment" 350 is not included in rectangle 335, even though the bits before and after "segment" 350 are not features, as the segment is not contiguous. Instead, "segment" 350 is actually two separate rectangles 355 and 360.

Figure 4A:
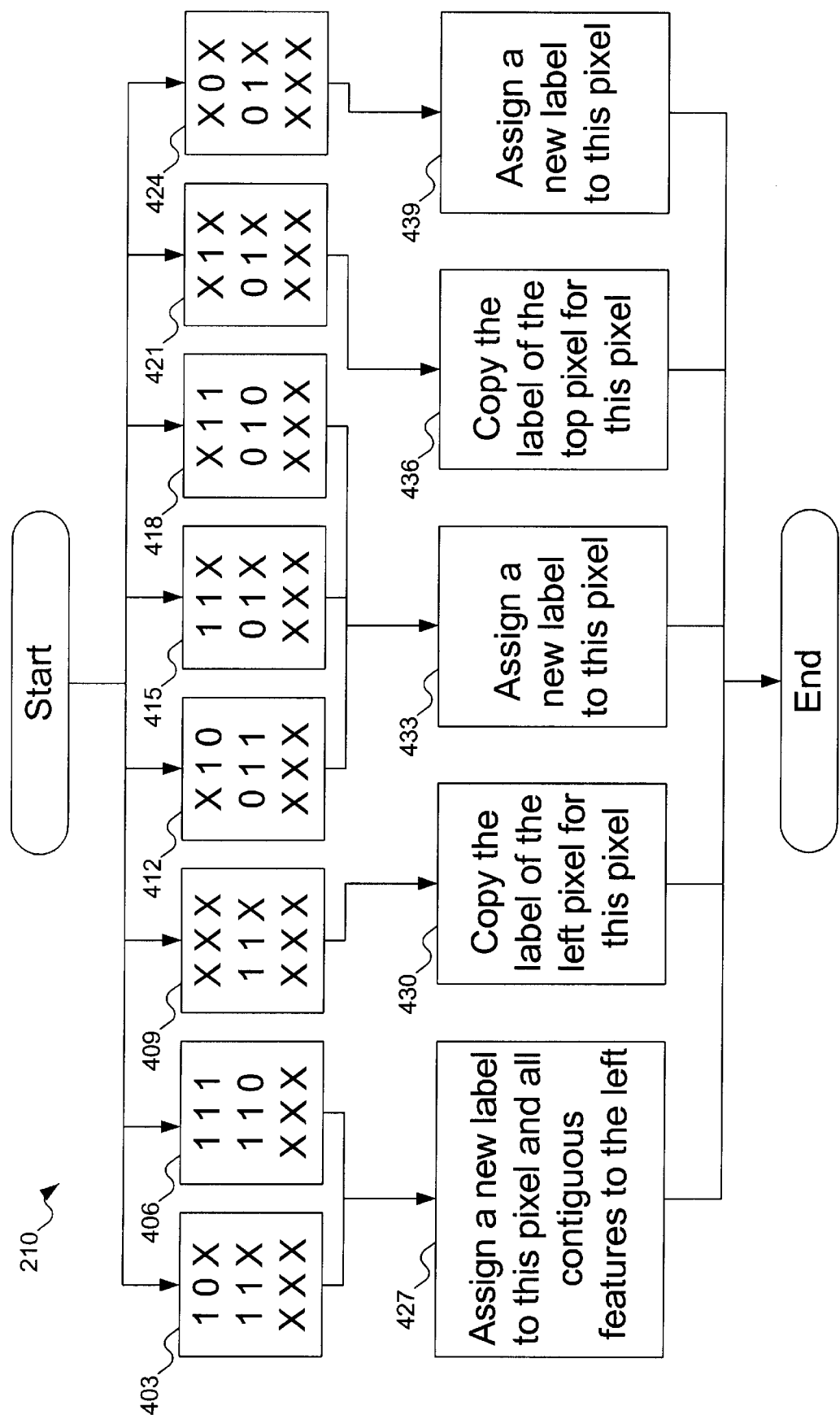
FIGS. 4A and 4B shows flowcharts for the row- and column-oriented decomposition using a pattern matching process and appropriate labeling action according to the preferred embodiment.
Figure 4B:
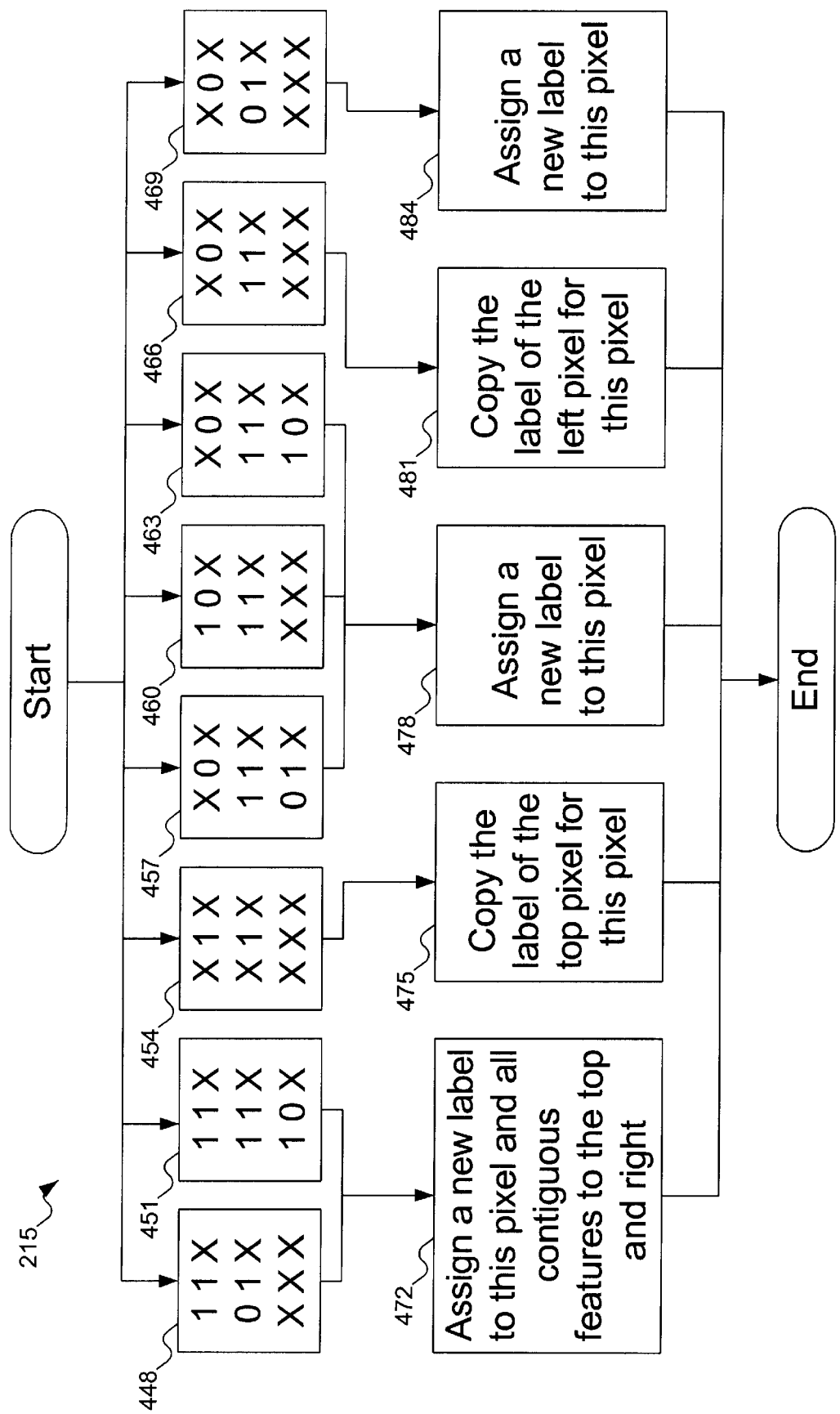

In the preferred embodiment, the binary image is scanned row by row, moving left to right within each row to perform decomposition. The 3×3 neighborhood surrounding each pixel is considered. When a pattern match is found, the appropriate labeling is performed, placing the pixel in the appropriate rectangle. Because the binary image is scanned sequentially, some small complications are introduced: namely, it may not be immediately apparent that a pixel belongs in a new rectangle. However, this complexity is offset by the efficiency of the algorithm, as each pixel is examined only once. In the description accompanying FIGS. 4A and 4B, the verb "to connect" means to give the current pixel the same label as the pixel to which the current pixel is being connected (i.e., the current pixel is included in the rectangle to which the current pixel is connected). In FIGS. 4A and 4B, a "one" represents a feature, a "zero" represents the absence of a feature, and an "X" represents a pixel whose value is not relevant to the 3×3 neighborhood (i.e., "X" will match either a "one" or "zero"). For simplicity of description, pixels on the border of the binary image are considered to have "zero" neighbors outside the border of the binary image.

FIG. 4A shows a flowchart for the row-oriented decomposition using a pattern matching process and appropriate labeling action. FIG. 4A is the preferred embodiment for the row-oriented decomposition of step 210. For each pixel in the row-oriented decomposition, the pixel's 3×3 neighborhood is compared with patterns 403–424. If the neighborhood matches patterns 403 or 406, then the current pixel is connected to the pixel to its left. But the current pixel belongs in a new rectangle, because it should not be connected to the pixel to its top. So, the current pixel is assigned a new label, which is propagated to all contiguously connected pixels to the left (operation 427). If the neighborhood matches pattern 409, then the pixel is connected to the pixel to its left (operation 430). If the neighborhood matches patterns 412, 415, or 418, then the pixel is part of a new rectangle and is assigned a new label (operation 433). If the neighborhood matches pattern 421, then the pixel is connected to the pixel to its top (operation 436). Otherwise, the neighborhood will match pattern 424, and the pixel belongs in a new rectangle and is assigned a new label (operation 439).

FIG. 4B shows a flowchart for the column-oriented decomposition using a pattern matching process and appropriate labeling action. FIG. 4B is the preferred embodiment for the column-oriented decomposition of step 215. For each pixel in the column-oriented decomposition, the pixel's 3×3 neighborhood is compared with patterns 448–469. If the neighborhood matches patterns 448 or 451, then the current pixel is connected to the pixel to its top. But the current pixel belongs in a new rectangle, because it should not be connected to the pixel to its left. So, the current pixel is assigned a new label, which is propagated to all contiguously connected pixels to the top (operation 472). Because pixels are scanned in the preferred embodiment from left to right, then top to bottom, operation 472 also propagates the new label to all pixels contiguously connected to the right of the new rectangle. If the neighborhood matches pattern 454, then the pixel is connected to the pixel to its top (operation 475). If the neighborhood matches patterns 457, 460, or 463, then the pixel is part of a new rectangle and is assigned a new label (operation 478). If the neighborhood matches pattern 466, then the pixel is connected to the pixel to its left (operation 481). Otherwise, the neighborhood will match pattern 469, and the pixel belongs in a new rectangle and is assigned a new label (operation 484).

Figure 5:
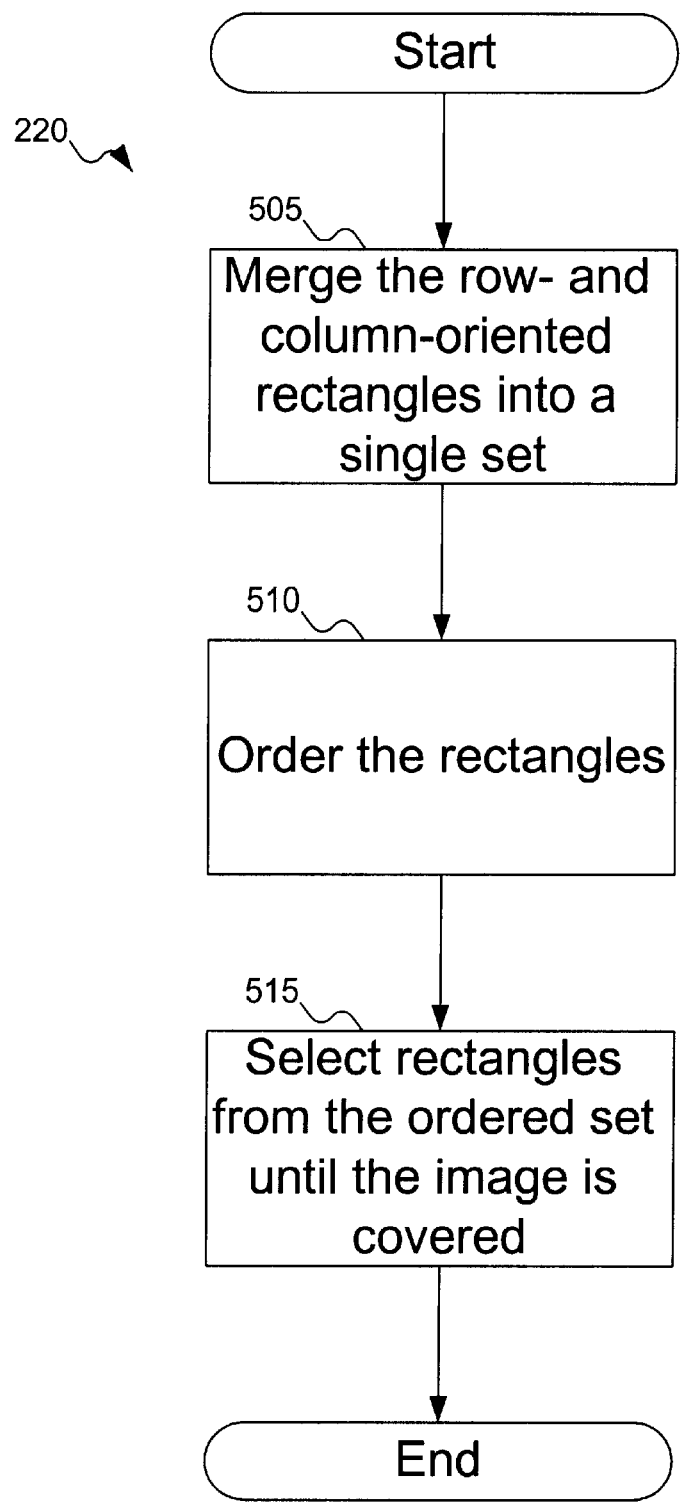
FIG. 5 shows a flowchart of how rectangles are selected to cover a binary image according to the preferred embodiment.

FIG. 5 shows a flowchart of how rectangles are selected to cover a binary image, as in step 220. First, at step 505, the rectangles of the row- and column-oriented decompositions are merged into a single set. The merger is a normal union operation on sets: if the row- and column-oriented decompositions happen to include identical rectangles (based on dimensions and location within the binary image), only one rectangle is included in the set. Then, at step 510, the rectangles in the set are ordered. In the preferred embodiment, the ordering is based on rectangle size. However, a person skilled in the art will recognize that other orderings can be used: for example, it might be preferable to identify all features that span the image in a direction, even though such features might be included in other rectangles.

Such an ordering can be useful for binary image processing of transformed maps of memory module defects. Finally, at step 515 rectangles are selected from the ordered set until each feature is covered by a rectangle. In the preferred embodiment, it is not critical that features be included in exactly one rectangle: in other words, features may be covered by multiple rectangles. A person skilled in the art, however, will recognize that the rectangles can be selected so that each feature is included in exactly one rectangle. (Note that this is always possible, since the row- and column oriented decompositions each divide the binary image into non-intersecting rectangles.) In the preferred embodiment, rectangles are retained even if they ultimately prove unnecessary. For example, it might be that a selected rectangle could be discarded without uncovering any features. For analysis of defects in memory modules via a transformed memory map, such information is useful. However, a person skilled in the art will recognize that the selection step can eliminate any unnecessary rectangles.

Figure 6A:
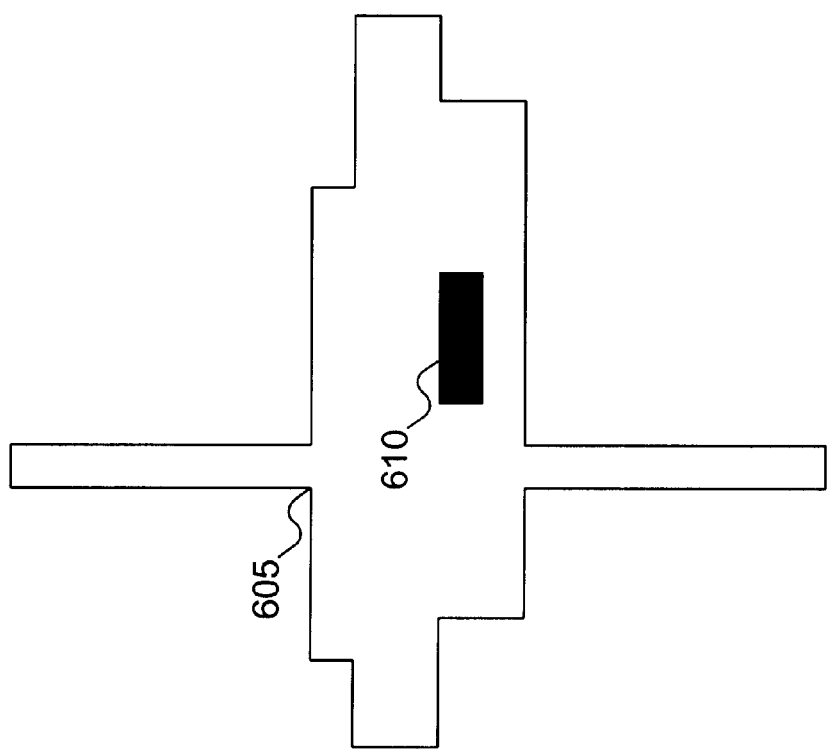
FIG. 6A shows a binary image to be decomposed according to the preferred embodiment.
Figure 6B:
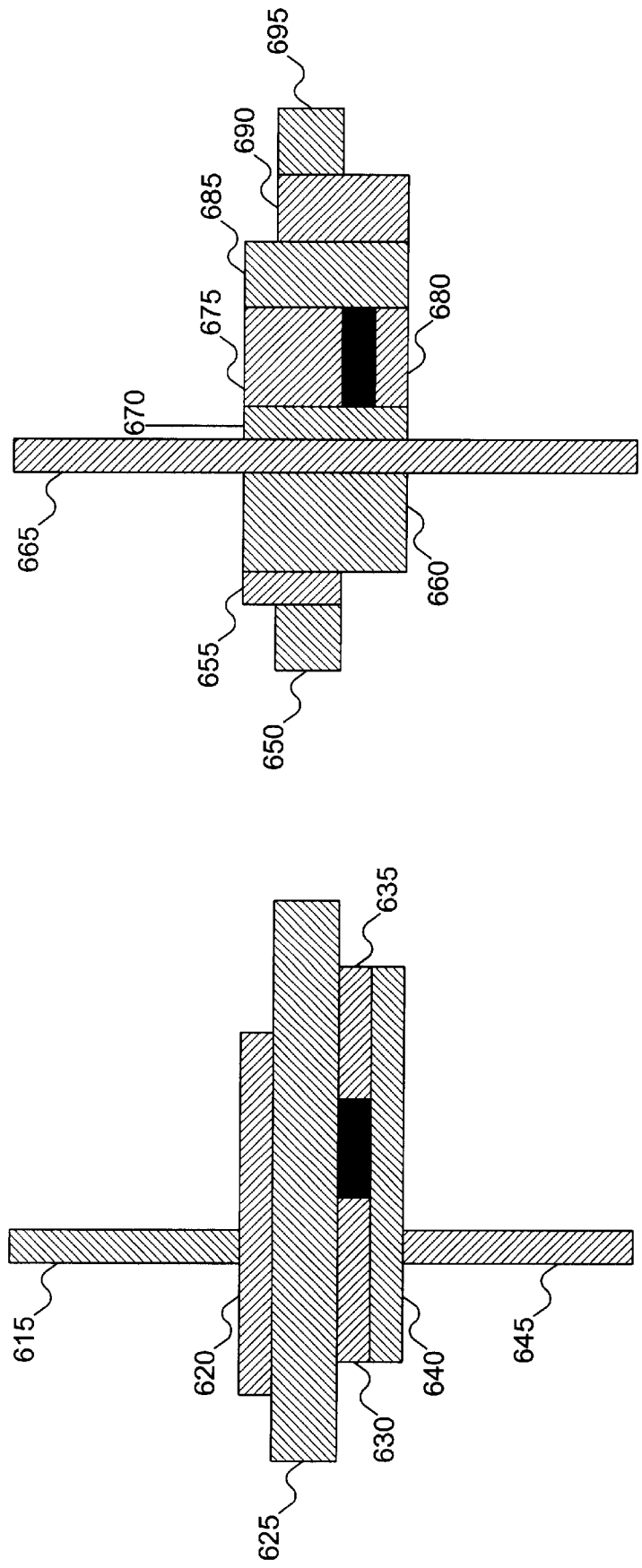
FIG. 6B shows row- and column-oriented decompositions of the binary image of FIG. 6A.
Figure 6C:
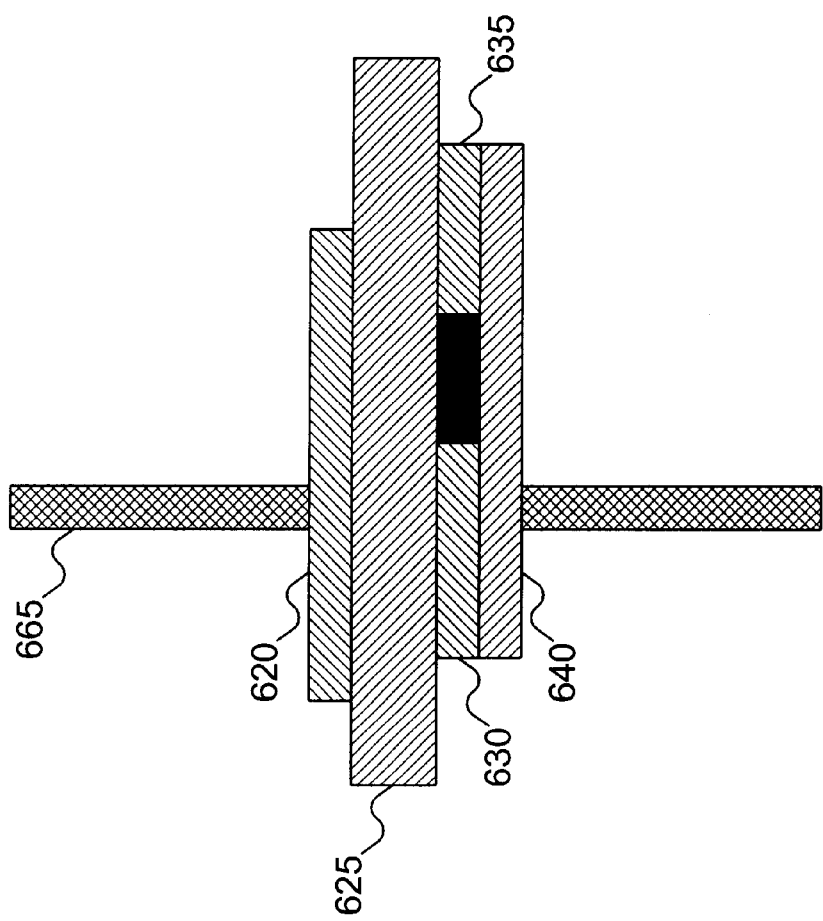
FIG. 6C shows a selection of rectangles from FIG. 6B that cover the binary image of FIG. 6A.

FIGS. 6A, 6B, and 6C show how the selection step 220 is done. FIG. 6A shows a feature 605 of a binary image. (Assume that the rest of the binary image has no features.) Feature 605 includes a hole 610: that is, hole 610 is an area within the boundary of feature 605 where no features are present. FIG. 6B shows row- and column-oriented decompositions of feature 605 that can be optionally displayed in step 225. The row-oriented decomposition includes row-oriented rectangles 615–645. The column-oriented decomposition includes rectangle 650–695. The shading of rectangles 615–695 is present only to help distinguish between the various rectangles and does not otherwise have any meaning. FIG. 6C shows the selected rectangles that would be displayed in step 225. The selected rectangles include 620, 625, 630, 635, 640, and 665. Note that the selected rectangles include both row- and column-oriented rectangles. Note further that column-oriented rectangle 665 includes features covered by row-oriented rectangles 620, 625, 630, and 640.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

I claim:

1. A method for raster reduction of a binary image containing a plurality of features, the method comprising:
   row decomposing the binary image into a set of rectangles along the row direction that cover the plurality of features;
   column decomposing the binary image into a set of rectangles along the column direction that cover the plurality of features; and
   selecting a subset of the set of rectangles along the row direction and the set of rectangles along the column direction that cover the plurality of features.

2. A method according to claim 1 wherein row decomposing the binary image includes:
   selecting a row segment including a contiguous set of features not included in any other rectangle along the row direction for a new rectangle, wherein the row segment includes a start point in a start column and an end point in an end column; and
   widening the new rectangle to include a contiguous set of row segments, wherein each row segment in the contiguous set of row segments includes a contiguous set of features and a start point in the start column and an end point in the end column.

3. A method according to claim 2 wherein row decomposing the binary image further includes repeating the steps of selecting a row segment and widening the new rectangle until each feature is covered by one rectangle along the row direction.

4. A method according to claim 2 wherein selecting a row segment including a contiguous set of features includes selecting the row with a longest length of contiguous features.

5. A method according to claim 4 wherein widening the new rectangle includes rejecting a row segment with features contiguous with the row segment but outside one of the start point or end point for the row segment.

6. A method according to claim 2 wherein row decomposing the binary image further includes displaying the row decomposition of the binary image, where each rectangle along the row direction is displayed using a different color.

7. A method according to claim 1 wherein column decomposing the binary image includes:
   selecting a column segment including a contiguous set of features not included in any other rectangle along the column direction for a new rectangle, wherein the column segment includes a start point in a start row and an end point in an end row; and
   widening the new rectangle to include a contiguous set of column segments, wherein each column segment in the contiguous set of column segments includes a contiguous set of features and a start point in the start row and an end point in the end row.

8. A method according to claim 7 wherein column decomposing the binary image further includes repeating the steps of selecting a column segment and widening the new rectangle until each feature is covered by one rectangle along the column direction.

9. A method according to claim 7 wherein selecting a column segment including a contiguous set of features includes selecting the column with a longest length of contiguous features.

10. A method according to claim 9 wherein widening the new rectangle includes rejecting a column segment with features contiguous with the column segment but outside one of the start point or end point for the column segment.

11. A method according to claim 7 wherein column decomposing the binary image further includes displaying the column decomposition of the binary image, where each rectangle along the column direction is displayed using a different color.

12. A method according to claim 1 wherein selecting a subset includes:
   merging the set of rectangles along the row direction and the set of rectangles along the column direction into a set of rectangles;
   ordering the set of rectangles; and
   selecting rectangles from the set of rectangles in order until each feature is covered by a rectangle.

13. A method according to claim 12 wherein merging the set of rectangles along the row direction and the set of rectangles along the column direction includes discarding a second rectangle that duplicates a first rectangle in the set of rectangles.

14. A method according to claim 12 wherein ordering the set of rectangles includes ordering the set of rectangles by size.

15. A method according to claim 12 selecting rectangles includes rejecting a first rectangle for which each feature covered by the first rectangle is also covered by at least one second rectangle of the selected rectangles.

16. A method according to claim 12 further including eliminating a first rectangle from the selected rectangles for which each feature covered by the first rectangle is also covered by at least one second rectangle of the selected rectangles.

17. A method according to claim 12 wherein a feature can be covered by more than one rectangle.

18. A method for detecting row and column defects in a memory module containing failed memory cells, the method comprising:

scanning the memory module for row defects by identifying row rectangles covering only the failed memory cells of the memory module, wherein each row in each identified row rectangle includes as many columns as possible;

scanning the memory module for column defects by identifying column rectangles covering only the failed memory cells of the memory module, wherein each column in each identified column rectangle includes as many rows as possible;

selecting a subset of the identified row rectangles and the identified column rectangles that include the failed memory cells of the memory module.

19. A computer-readable medium containing a program for raster reduction of a binary image containing a plurality of features, the program comprising:

row decomposition software to decompose the binary image into a set of rectangles along the row direction that cover the plurality of features;

column decomposition software to decompose the binary image into a set of rectangles along the column direction that cover the plurality of features; and selection software to select a subset of the set of rectangles along the row direction and the set of rectangles along the column direction that cover the plurality of features.

20. A program according to claim 19 wherein the row decomposition software to decompose the binary image includes:

selection software to select a row segment including a contiguous set of features not included in any other rectangle along the row direction for a new rectangle, wherein the row segment includes a start point in a start column and an end point in an end column; and widening software to widen the new rectangle to include a contiguous set of row segments, wherein each row segment in the contiguous set of row segments includes a contiguous set of features and a start point in the start column and an end point in the end column.

21. A program according to claim 19 wherein the column decomposition software to decompose the binary image includes:

selection software to select a column segment including a contiguous set of features not included in any other rectangle along the column direction for a new rectangle, wherein the column segment includes a start point in a start row and an end point in an end row; and widening software to widen the new rectangle to include a contiguous set of column segments, wherein each column segment in the contiguous set of column segments includes a contiguous set of features and a start point in the start row and an end point in the end row.

22. A program according to claim 19 wherein the selection software to select a subset includes:

merging software to merge the set of rectangles along the row direction and the set of rectangles along the column direction into a set of rectangles;

ordering software to order the set of rectangles; and selection software to select rectangles from the set of rectangles in order until each feature is covered by a rectangle.

23. A program according to claim 22 the selection software to select rectangles includes rejection software to reject a first rectangle for which each feature covered by the first rectangle is also covered by at least one second rectangle of the selected rectangles.

24. A computer-readable medium containing a program for detecting row and column defects in a memory module containing failed memory cells, the program comprising:

row scanning software to scan the memory module for row defects by identifying row rectangles covering only the failed memory cells of the memory module, wherein each row in each identified row rectangle includes as many columns as possible;

column scanning software to scan the memory module for column defects by identifying column rectangles covering only the failed memory cells of the memory module, wherein each column in each identified column rectangle includes as many rows as possible;

selection software to select a subset of the identified row rectangles and the identified column rectangles that include the failed memory cells of the memory module.

25. A system for raster reduction of a binary image containing a plurality of features, the system comprising:

a row decomposition unit to decompose the binary image into a set of rectangles along the row direction that cover the plurality of features;

a column decomposition unit to decompose the binary image into a set of rectangles along the column direction that cover the plurality of features; and a selection unit to select a subset of the set of rectangles along the row direction and the set of rectangles along the column direction that cover the plurality of features.

26. A system according to claim 25 wherein the row decomposition unit to decompose the binary image includes:

a selection unit to select a row segment including a contiguous set of features not included in any other rectangle along the row direction for a new rectangle, wherein the row segment includes a start point in a start column and an end point in an end column; and a widening unit to widen the new rectangle to include a contiguous set of row segments, wherein each row segment in the contiguous set of row segments includes a contiguous set of features and a start point in the start column and an end point in the end column.

27. A system according to claim 25 wherein the column decomposition unit to decompose the binary image includes:

a selection unit to select a column segment including a contiguous set of features not included in any other rectangle along the column direction for a new rectangle, wherein the column segment includes a start point in a start row and an end point in an end row; and a widening unit to widen the new rectangle to include a contiguous set of column segments, wherein each column segment in the contiguous set of column segments includes a contiguous set of features and a start point in the start row and an end point in the end row.

28. A system according to claim 25 wherein the selection unit to select a subset includes:

a merging unit to merge the set of rectangles along the row direction and the set of rectangles along the column direction into a set of rectangles;

an ordering unit to order the set of rectangles; and a selection unit to select rectangles from the set of rectangles in order until each feature is covered by a rectangle.

29. A system according to claim 28 the selection unit to select rectangles includes a rejection unit to reject a first rectangle for which each feature covered by the first rectangle is also covered by at least one second rectangle of the selected rectangles.

30. A system for detecting row and column defects in a memory module containing failed memory cells, the system comprising:

a row scanning unit to scan the memory module for row defects by identifying row rectangles covering only the failed memory cells of the memory module, wherein each row in each identified row rectangle includes as many columns as possible;

a column scanning unit to scan the memory module for column defects by identifying column rectangles covering only the failed memory cells of the memory module, wherein each column in each identified column rectangle includes as many rows as possible;

a selection unit to select a subset of the identified row rectangles and the identified column rectangles that include the failed memory cells of the memory module.

* * * * *